(12) United States Patent
Kinoshita et al.

(10) Patent No.: US 12,111,291 B2
(45) Date of Patent: Oct. 8, 2024

(54) STRUCTURE DIAGNOSIS APPARATUS, STRUCTURE DIAGNOSIS METHOD, AND COMPUTER-READABLE RECORDING MEDIUM

(71) Applicant: NEC Corporation, Tokyo (JP)

(72) Inventors: Shohei Kinoshita, Tokyo (JP); Shigeru Kasai, Tokyo (JP); Yu Kiyokawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 479 days.

(21) Appl. No.: 17/435,482

(22) PCT Filed: Jan. 16, 2020

(86) PCT No.: PCT/JP2020/001377
§ 371 (c)(1),
(2) Date: Sep. 1, 2021

(87) PCT Pub. No.: WO2020/179241
PCT Pub. Date: Sep. 10, 2020

(65) Prior Publication Data
US 2022/0137003 A1 May 5, 2022

(30) Foreign Application Priority Data
Mar. 5, 2019 (JP) ................. 2019-040049

(51) Int. Cl.
*G01N 29/12* (2006.01)
*G01H 17/00* (2006.01)
(Continued)

(52) U.S. Cl.
CPC ..... *G01N 29/12* (2013.01); *G01N 2291/0289* (2013.01)

(58) Field of Classification Search
CPC ........... G01N 29/12; G01N 2291/0421; G01N 29/46; G01N 29/4427; G01N 2291/0258;
(Continued)

(56) References Cited

U.S. PATENT DOCUMENTS

2007/0052426 A1 3/2007 Wells et al.
2016/0109355 A1* 4/2016 Takaeda ................. G01N 29/46
702/34
2017/0363504 A1 12/2017 Winant et al.

FOREIGN PATENT DOCUMENTS

CN 103530275 A 1/2014
CN 103530375 A 1/2014
(Continued)

OTHER PUBLICATIONS

Machine translation of JP 2001-296214 to Morial et al. (Year: 2001).*

(Continued)

*Primary Examiner* — Daniel J Colilla

(57) ABSTRACT

A structure diagnosis apparatus 1 for diagnosing a state of a structure in which there is a small change in the natural frequency includes: a natural vibration extraction unit 2 configured to acquire, from a plurality of sensors 21 that a structure is provided with 20, vibration information indicating vibration generated in the structure 20, and extracting natural vibration using the vibration information; a spectral shape extraction unit 3 configured to extract spectral shape information indicating a shape of a spectrum using the natural vibration; an index calculation unit 4 for calculating an index indicating a relationship between the spectral shape information and reference spectral shape information that is a preset reference; and a state estimation unit 5 for estimating the state of the structure based on the index.

9 Claims, 8 Drawing Sheets

(51) Int. Cl.
*G01N 29/14* (2006.01)
*G01N 29/46* (2006.01)

(58) Field of Classification Search
CPC .............. G01N 29/348; G01N 29/42; G01N 2291/014; G01N 2203/0062; G01H 1/00
See application file for complete search history.

(56) References Cited

FOREIGN PATENT DOCUMENTS

| | | |
|---|---|---|
| JP | 2001-296214 A | 10/2001 |
| JP | 2007-128190 A | 5/2007 |
| JP | 2008-008810 A | 1/2008 |
| JP | 2008-255571 A | 10/2008 |
| JP | 2012-242363 A | 12/2012 |
| JP | 2013-040774 A | 2/2013 |
| JP | 2015-102363 A | 6/2015 |
| JP | 2015-219078 A | 12/2015 |
| JP | 2016-218032 A | 12/2016 |
| JP | 2018-179863 A | 11/2018 |
| KR | 101523696 B1 * | 10/2001 |

OTHER PUBLICATIONS

Zhou et al.; Vibration-Based Detection of Small-Scale Damage on a Bridge Deck; Sep. 2007; Journal of Structural Engineering; pp. 1257-1267. (Year: 2007).*
English translation of Written opinion for PCT Application No. PCT/JP2020/001377, mailed on Feb. 18, 2020.
International Search Report for PCT Application No. PCT/JP2020/001377, mailed on Feb. 18, 2020.
JP Office Action for JP Application No. 2021-503447, mailed on Jul. 12, 2022 with English Translation.

* cited by examiner

STRUCTURE DIAGNOSIS APPARATUS, STRUCTURE DIAGNOSIS METHOD, AND COMPUTER-READABLE RECORDING MEDIUM

This application is a National Stage Entry of PCT/JP2020/001377 filed on Jan. 16, 2020, which claims priority from Japanese Patent Application 2019-040049 filed on Mar. 5, 2019, the contents of all of which are incorporated herein by reference, in their entirety.

TECHNICAL FIELD

The present invention relates to a structure diagnosis apparatus for diagnosing a structure, and a structure diagnosis method, and further relates to a computer-readable recording medium in which a program for realizing them is recorded.

BACKGROUND ART

When a structure is damaged, mechanical properties such as rigidity and viscosity change, and natural vibration, which is one vibration characteristic, also changes accordingly. Therefore, a technique for detecting local damage to a structure by focusing on a change in natural vibration generated in the structure is known.

As a related technique, Patent Document 1 discloses a method for diagnosing soundness of a concrete building, in which a natural frequency (natural vibration frequency) is calculated using microtremors generated in the concrete building, and the soundness of the concrete building is diagnosed based on a relationship between changes in internal and external temperatures of the concrete building and daily variations in the natural frequency.

Further, as a related technique, Patent Document 2 discloses a diagnostic system for large buildings. According to the diagnostic system, the natural frequency of a large building is calculated, compared with the natural frequency of the large building when it is sound, and a determination as to whether or not there is an abnormality in the large building is made based on the comparison result.

LIST OF RELATED ART DOCUMENTS

Patent Document

Patent Document 1: Japanese Patent Laid-Open Publication No. 2008-008810
Patent Document 2: Japanese Patent Laid-Open Publication No. 2008-255571

SUMMARY

Technical Problems

However, in the case of a structure that has high rigidity and is unlikely to shake, it is known that natural vibration other than primary natural vibration is unlikely to occur. Further, it is known that in a structure that has high rigidity and is unlikely shake, a change in the natural frequency of the primary natural vibration with respect to a local change in rigidity is small.

Therefore, in the diagnoses disclosed in Patent Documents 1 and 2, if a change in the natural frequency of the primary natural vibration is small, damage to the structure may not be detected based on the change.

An example of an object of the present invention is to provide a structure diagnosis apparatus capable of diagnosing a state of a structure in which there is a small change in natural frequency, a structure diagnosis method, and a computer-readable recording medium.

Solution to the Problems

In order to achieve the above object, a structure diagnosis apparatus according to one aspect of the present invention includes:
a natural vibration extraction unit configured to acquire, from a plurality of sensors that a structure is provided with, vibration information indicating vibration generated in the structure, and extracting natural vibration using the vibration information;
a spectral shape extraction unit configured to extract spectral shape information indicating a shape of a spectrum using the natural vibration;
an index calculation unit configured to calculate an index indicating a relationship between the spectral shape information and reference spectral shape information that is a preset reference; and
a state estimation unit configured to estimate a state of the structure based on the index.

Further, in order to achieve the above object, a structure diagnosis method according to one aspect of the present invention includes:
a natural vibration extraction step of acquiring, from a plurality of sensors that a structure is provided with, vibration information indicating vibration generated in the structure, and extracting natural vibration using the vibration information;
a spectral shape information extraction step of extracting spectral shape information indicating a shape of a spectrum using the natural vibration;
a calculation step of calculating an index indicating a relationship between the spectral shape information and reference spectral shape information that is a preset reference; and
an estimating step of estimating a state of the structure based on the index.

Further, in order to achieve the above object, a computer-readable recording medium for a program, according to one aspect of the present invention, records the program including instructions that cause a computer to perform the following steps:
a natural vibration extraction step of acquiring, from a plurality of sensors that a structure is provided with, vibration information indicating vibration generated in the structure, and extracting natural vibration using the vibration information;
a spectral shape information extraction step of extracting spectral shape information indicating a shape of a spectrum using the natural vibration;
a calculation step of calculating an index indicating a relationship between the spectral shape information and reference spectral shape information that is a preset reference; and
an estimating step of estimating a state of the structure based on the index.

Advantageous Effects of the Invention

As described above, according to the present invention, it is possible to diagnose the state of the structure in which there is a small change in natural frequency.

EXAMPLE EMBODIMENT

Hereinafter, an example embodiment of the present invention will be described with reference to FIGS. 1 to 8.

[Apparatus Configuration]

Figure 1:
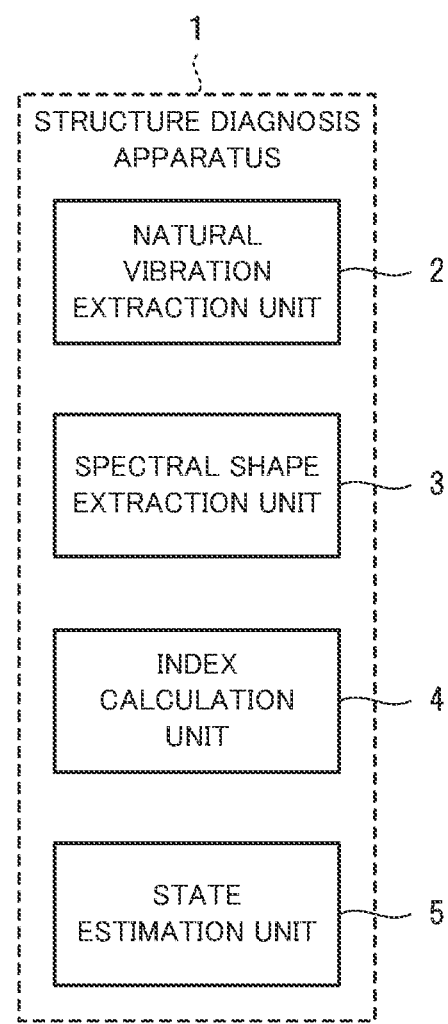
FIG. 1 is a diagram illustrating an example of a structure diagnosis apparatus.

First, a configuration of a structure diagnosis apparatus 1 according to the example embodiment will be described with reference to FIG. 1. FIG. 1 is a diagram illustrating an example of a structure diagnosis apparatus.

The structure diagnosis apparatus illustrated in FIG. 1 is an apparatus that diagnoses the state of a structure in which there is a small change in natural frequency. Further, as illustrated in FIG. 1, the structure diagnosis apparatus 1 includes a natural vibration extraction unit 2, a spectral shape extraction unit 3, an index calculation unit 4, and a state estimation unit 5.

Of these, the natural vibration extraction unit 2 acquires, from a plurality of sensors that a structure is provided with, vibration information indicating vibration generated in the structure, and extracts natural vibration using the vibration information. The spectral shape extraction unit 3 extracts spectral shape information indicating a shape of a spectrum using the natural vibration. The index calculation unit 4 calculates an index indicating a relationship between the spectral shape information and reference spectral shape information that is a preset reference. The state estimation unit 5 estimates the state of the structure based on the index.

Here, the structure is, for example, a cured product (concrete, mortar or the like) solidified with at least sand, water, or cement, metal, or a structure constructed using these. Further, the structure forms the entirety of or a part of a building. Furthermore, the structure forms the entirety of or a part of a machine.

As described above, in the example embodiment, since the state of the structure is estimated based on the index indicating the relationship between the spectral shape information indicating the shape of the spectrum using the natural vibration and the reference spectral shape information that is the preset reference, it is possible to diagnose the state of a structure in which there is a small change in natural frequency.

[System Configuration]

Figure 2:
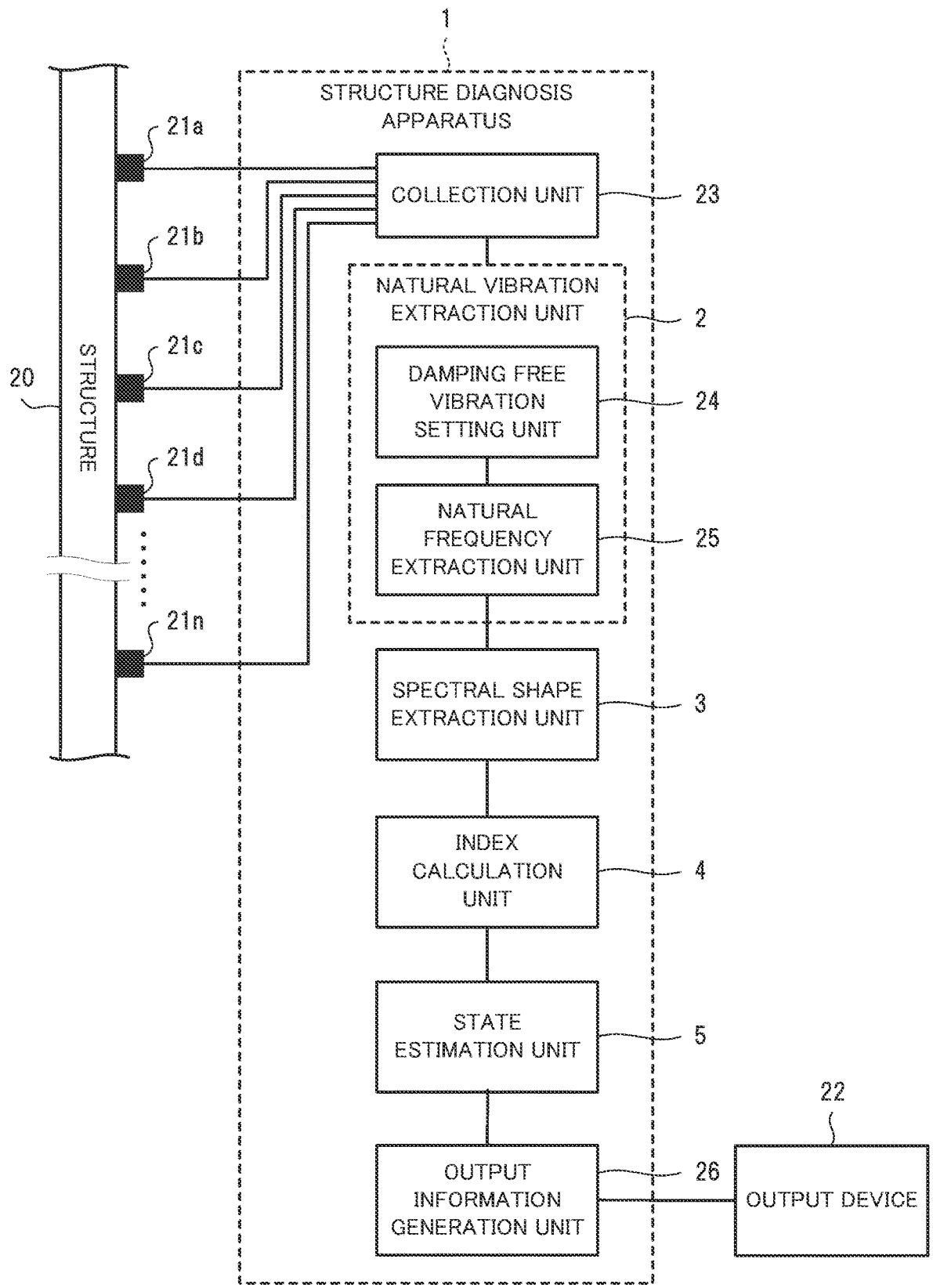
FIG. 2 is a diagram illustrating an example of a system including the structure diagnosis apparatus.

Subsequently, the configuration of the structure diagnosis apparatus 1 in the example embodiment will be described in more detail with reference to FIG. 2. FIG. 2 is a diagram illustrating an example of a system including the structure diagnosis apparatus.

As illustrated in FIG. 2, the system including the structure diagnosis apparatus 1 in the example embodiment includes the structure diagnosis apparatus 1, a plurality of sensors 21 (21a to 21n), and an output device 22. Further, the structure diagnosis apparatus 1 includes a collection unit 23 in addition to the natural vibration extraction unit 2, the spectral shape extraction unit 3, the index calculation unit 4, and the state estimation unit 5. Furthermore, the natural vibration extraction unit 2 includes a damping free vibration setting unit 24 and a natural frequency extraction unit 25.

A structure 20 is, for example, a structure such as a floor slab of a bridge. However, members constituting the structure 20 are not limited to a floor slab.

The sensor 21 is attached to the structure 20, measures at least a magnitude of vibration of the structure 20, and transmits information indicating the measured magnitude of vibration to the structure diagnosis apparatus 1. As the sensor 21, it is conceivable to use, for example, a triaxial acceleration sensor, a fiber sensor, or the like.

Specifically, the sensors 21a to 21n are attached to the structure 20 as illustrated in FIG. 2, and measure acceleration at positions to which the sensors 21 are respectively attached. Subsequently, each of the sensors 21a to 21n transmits a signal having the measured acceleration information to the collection unit 23 of the structure diagnosis apparatus 1. Note that, wired communication, wireless communication, or the like is used for communication between the sensor 21 and the collection unit 23.

The output device 22 acquires output information converted into a format that can be output by an output information generation unit 26, and outputs a generated image, audio, or the like based on the output information. The output device 22 is, for example, an image display device using a liquid crystal, organic electro luminescence (EL), or a cathode ray tube (CRT). Further, the image display device may include an audio output device such as a speaker. The output device 22 may be a printing device such as a printer. The output information will be described below.

The structure diagnosis apparatus will be described.

Figure 3:
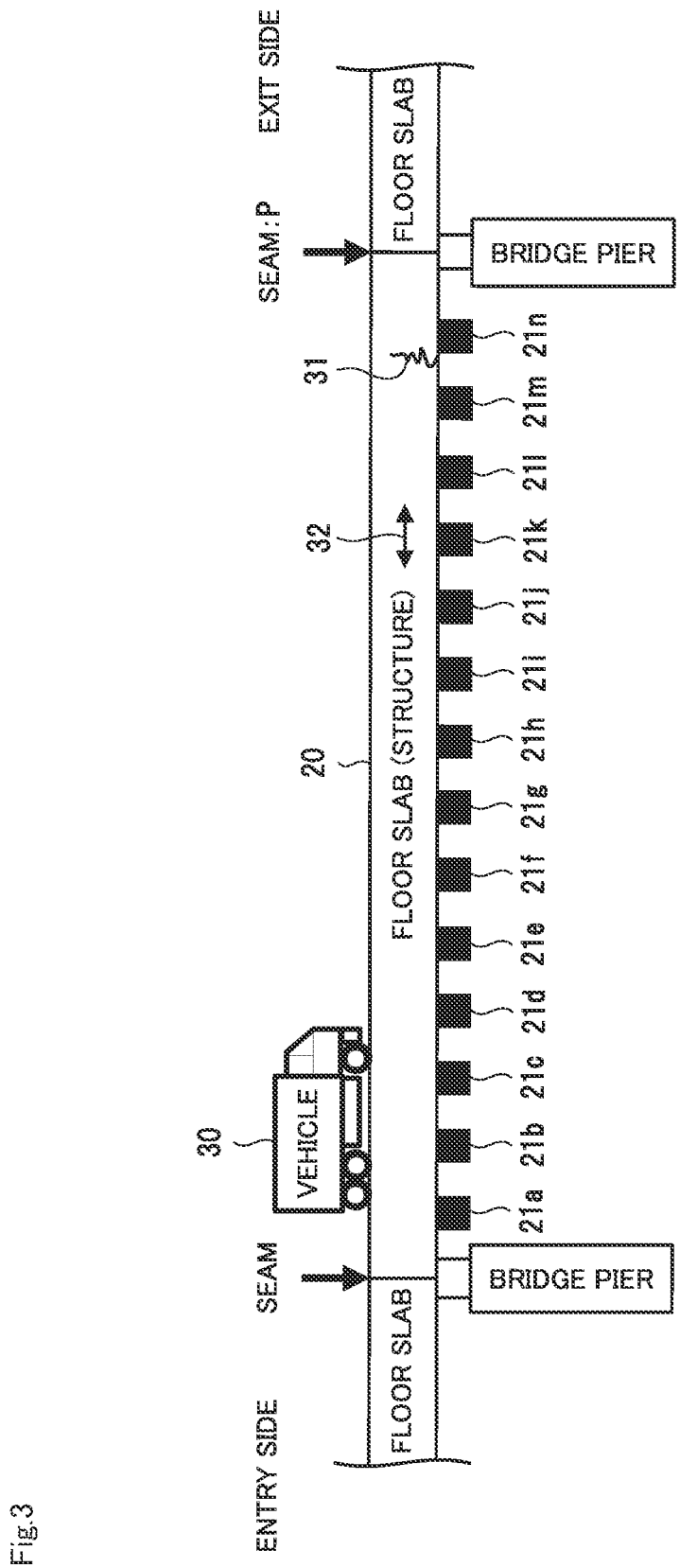
FIG. 3 is a diagram illustrating an example of a structure.
Figure 4:
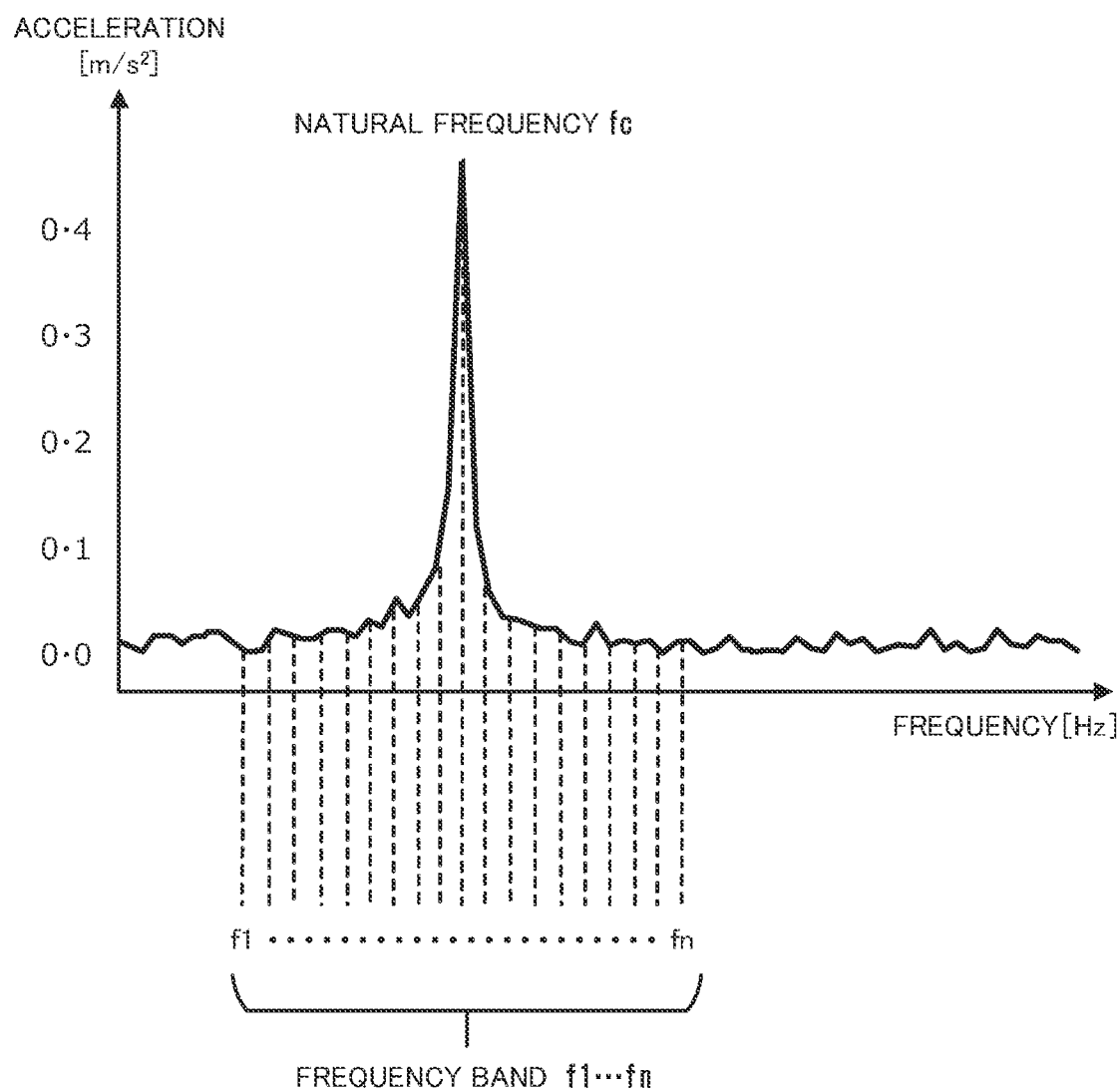
FIG. 4 is a diagram for explaining a spectral shape.
Figure 5:
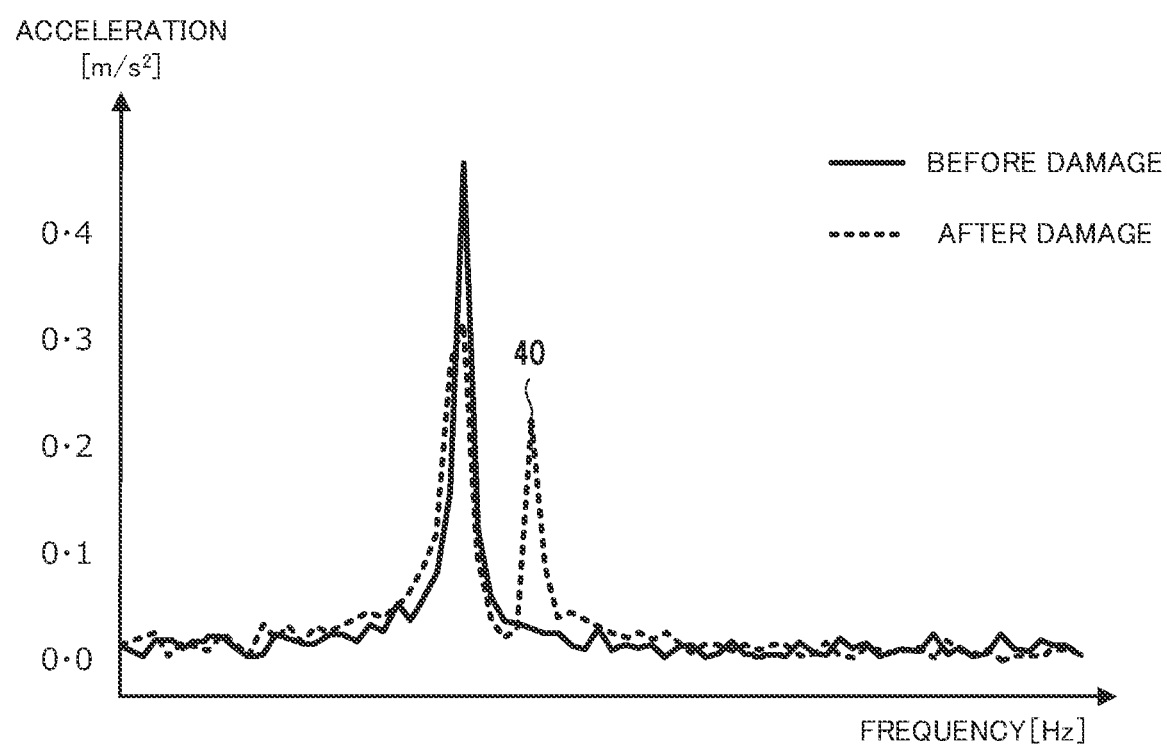
FIG. 5 is a diagram illustrating an example of the spectral shape.
Figure 6:
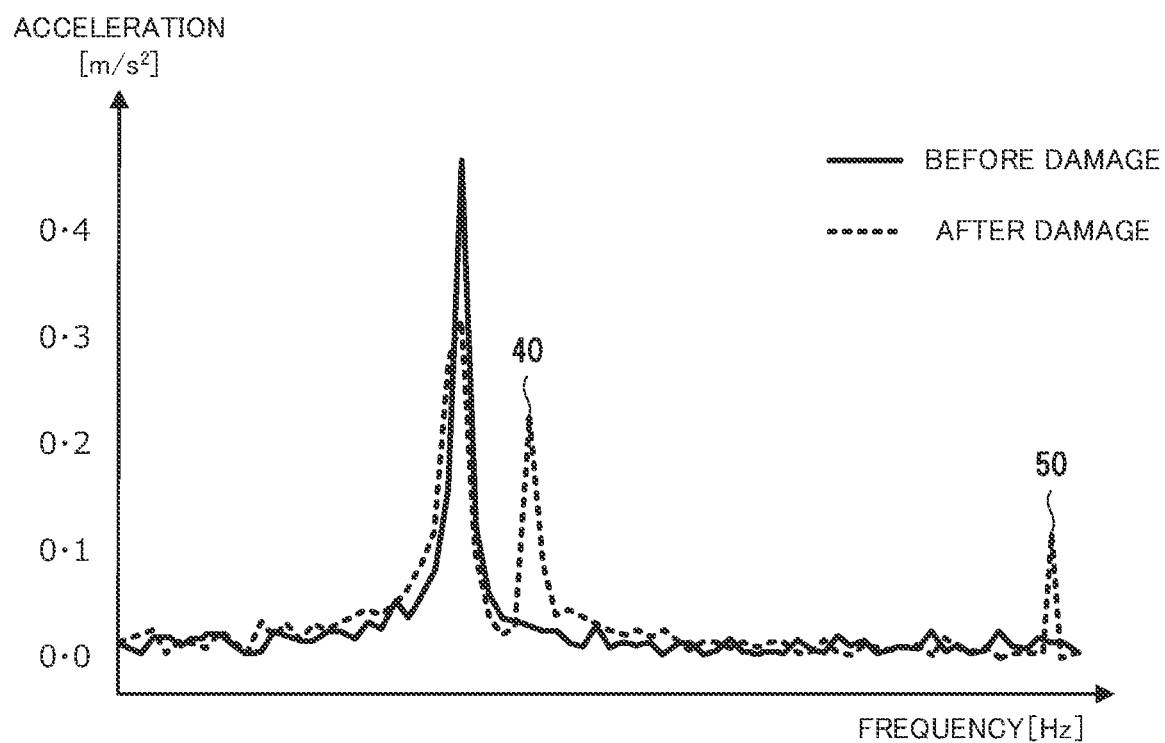
FIG. 6 is a diagram illustrating an example of the spectral shape of longitudinal vibration.

The structure diagnosis apparatus will be described in detail with reference to FIGS. 3, 4, 5, and 6. FIG. 3 is a diagram illustrating an example of the structure. FIG. 4 is a diagram for explaining a spectral shape. FIG. 5 is a diagram illustrating an example of the spectral shape. FIG. 6 is a diagram illustrating an example of the spectral shape of longitudinal vibration.

In the bridge illustrated in FIG. 3, for example, a vehicle 30 is run a plurality of times from an entry side to an exit side on the structure 20 (floor slab) to give the structure 20 one or more vibrations. Further, in the example shown in FIG. 3, when the vehicle 30 passes over a seam P, an impact is applied to the structure 20 with the seam P acting as a fulcrum, and the structure 20 vibrates. In addition, 31 in FIG. 3 indicates a damaged part.

The vehicle 30 is a device used to impart vibration to the structure 20. However, the device that imparts vibration is not limited to the vehicle 30. For example, the device that imparts vibration may be a vibrator prepared in advance. Alternatively, vibration may be applied by dropping a weight prepared in advance. However, the method is not limited to the above methods.

The collection unit 23 acquires the information regarding acceleration measured by the sensor 21. Specifically, the collection unit 23 receives a signal including information regarding acceleration measured by each of the sensors 21a to 21n attached to the structure 20.

The natural vibration extraction unit 2 acquires the vibration information indicating vibration generated in the structure 20 from the sensors 21 that the structure 20 is provided with, and extracts the natural vibration using the acquired vibration information. The natural vibration has information related to a natural vibration such as the natural frequency. The natural vibration is, for example, primary natural vibration or the like. The primary natural vibration is the natural vibration having the lowest natural frequency, that is, the natural vibration having the lowest vibration frequency.

Further, the natural vibration extraction unit 2 extracts the natural vibration corresponding to the longitudinal vibration as the natural vibration. The longitudinal vibration is, for example, an expansion and contraction motion generated in the longitudinal direction (double-headed arrow 32) of the structure 20 as illustrated in FIG. 3 when a tensile force or a compressive force is applied to the structure 20.

Specifically, the natural vibration extraction unit 2 calculates the natural frequency by using the damping free vibration setting unit 24 and the natural frequency extraction unit 25 illustrated in FIG. 2.

The damping free vibration setting unit 24 sets a damping free vibration section for each piece of vibration information collected from the sensors 21. Specifically, the damping free vibration setting unit 24 acquires vibration information indicating the acceleration measured by each of the sensors 21a to 21n from the collection unit 23.

Subsequently, the damping free vibration setting unit 24 determines whether or not the acceleration measured by the sensor 21n exceeds a threshold Th1. If the acceleration exceeds the threshold Th1, the damping free vibration setting unit 24 sets a section included in a period of time from a time (a start date and time ts) when the acceleration exceeds the threshold Th1 to a time (an end date and time te) when a predetermined time elapses as a damping free vibration section.

Further, the damping free vibration setting unit 24 also sets the damping free vibration section for the vibration information measured by each of the sensors 21a to 21m.

The natural frequency extraction unit 25 extracts the natural frequency based on the selected damping free vibration. Specifically, the natural frequency extraction unit 25 converts (performs, for example, Fourier transformation on) amplitude information (the acceleration) from a time domain to a frequency domain in the damping free vibration section set for each of the sensors 21a to 21n.

Subsequently, the natural frequency extraction unit 25 extracts a natural frequency fc by using an extraction method 1 or an extraction method 2 described below.

In the extraction method 1, the natural frequency extraction unit 25 extracts a frequency (natural frequency) at which an amplitude is greater than or equal to a predetermined value for each of the sensors 21a to 21n. The frequency at which the amplitude is greater than or equal to the predetermined value is, for example, a frequency at which the amplitude has a maximum value, a local maximum value, or a peak value.

Subsequently, the natural frequency extraction unit 25 sets, for example, an average frequency of the natural frequencies of all sensors 21, an average frequency of the natural frequencies of two or more preselected sensors 21, or the natural frequency of a preselected sensor 21 as a natural frequency fc.

Further, in the extraction method 2, the natural frequency extraction unit 25 calculates a representative spectrum by combining the spectra of all of the sensors 21 or the spectra of two or more preselected sensors 21. Combining the spectra means, for example, extracting the maximum value of the amplitude of the spectrum of all of the sensors 21 or two or more preselected sensors 21, at each frequency.

Subsequently, the natural frequency extraction unit 25 extracts a frequency (natural frequency) at which the amplitude of the representative spectrum is greater than or equal to the predetermined value, and sets it as the natural frequency fc. The frequency at which the amplitude is greater than or equal to the predetermined value is, for example, the frequency at which the amplitude has the maximum value, the local maximum value, or the peak value. However, a method for determining the natural frequency fc is not limited to the above-mentioned method.

The spectral shape extraction unit 3 extracts the spectral shape information indicating the spectral shape using the natural vibration. Specifically, the spectral shape extraction unit 3 first acquires the natural frequency fc extracted by the natural frequency extraction unit 25.

Subsequently, the spectrum shape extractor 3 sets a frequency band so as to include the natural frequency fc. Subsequently, the spectrum shape extractor 3 calculates a measurement spectrum by using a calculation method 1 or a calculation method 2 described below.

In the calculation method 1, the spectral shape extraction unit 3 calculates the measurement spectrum by combining the spectra of all of the sensors 21 or the spectra of two or more preselected sensors 21. Combining the spectra means, for example, extracting the maximum value of the amplitude of the spectrum of all of the sensors 21 or two or more preselected sensors 21, at each frequency.

Further, in the calculation method 2, the spectral shape extraction unit 3 sets the spectrum of a preselected sensor 21 as the measurement spectrum.

Subsequently, the spectral shape extraction unit 3 generates the spectral shape information used to indicate the spectral shape from the measurement spectrum by using the amplitude and phase of each frequency within the set frequency band.

The spectral shape will be described with reference to FIG. 4. The spectrum shown in FIG. 4 is the measurement spectrum. In the example shown in FIG. 4, the spectral shape extraction unit 3 generates the spectral shape information using the amplitude and the phase of each frequency of the measurement spectrum in the set frequency bands f1 to fn. The spectral shape information can be indicated by, for example, a vector such as that shown in Equation 1.

$$a = \begin{pmatrix} a_1 \\ a_2 \\ \vdots \\ a_n \end{pmatrix} = \begin{pmatrix} A_{f_1} e^{j\theta_{f_1}} \\ A_{f_2} e^{j\theta_{f_2}} \\ A_{f_n} e^{j\theta_{f_n}} \end{pmatrix}$$ [Equation 1]

a: Measurement spectral shape vector
$a_1, a_2, \ldots, a_n$: Vector element
$A_{r_1}, A_{r_2}, \ldots, A_{r_n}$: Amplitude
$\theta_{f_1}, \theta_{f_2}, \ldots, \theta_{f_n}$: Phase Here, when the structure 20 is not damaged (before the structure 20 illustrated in FIG. 3 is damaged (normal state: reference)), the spectral shape is indicated by a solid line in FIG. 5. Further, when the structure 20 is locally damaged, the spectral shape is indicated by a broken line in FIG. 5. That is, since a new vibration component 40 is generated at a position different from the spectral shape before damage, the spectral shape is different from that before the damage.

Further, when the structure 20 is locally damaged, a new vibration component 50 corresponding to the longitudinal vibration is generated at a position different from the spectral shape before the damage as illustrated in FIG. 6. That is, the spectral shape changes due to generation of the new vibration component.

The index calculation unit 4 calculates the index indicating the relationship between the spectral shape information and the reference spectral shape information. Specifically, the index calculation unit 4 calculates the index using (1) inter-vector distance, (2) inter-vector similarity, (3) fitness function, or the like.

(1) A Case where the Inter-Vector Distance is Used as the Index Will be Described.

The index calculation unit 4 calculates the inter-vector distance between the spectral shape information and the reference spectral shape information and sets it as the index. The inter-vector distance is, for example, a weighted Minkowski distance, a Euclidean distance, a Chebyshev distance, or the like.

The weighted Minkowski distance $d_{(q)}(a, b)$ is calculated using the formula shown in Equation 2.

$$d_{(q)}(a, b) = \left(\sum_{k=1}^{n} w_k |a_k - b_k|^q\right)^{1/q} \quad \text{[Equation 2]}$$

$$w_k > 0$$

$$q \geq 0$$

$$a = \begin{pmatrix} a_1 \\ a_2 \\ \vdots \\ a_n \end{pmatrix}, b = \begin{pmatrix} b_1 \\ b_2 \\ \vdots \\ b_n \end{pmatrix}$$

$d_{(q)}$: Weighted Minkowski distance
a: Measurement spectral shape vector
$a_1, a_2, \ldots, a_n$: Vector element
b: Reference spectral shape vector
$b_1, b_2, \ldots, b_n$: Vector element
$w_k$: Weight
q: Parameter The Euclidean distance $d_{(2)}(a, b)$ is calculated using the formula shown in Equation 3. That is, it is calculated by setting the weight as $W_k=1$ and the parameter as $q=2$ in Equation 2.

$$d_{(2)}(a,b) = \sqrt{\sum_{k=1}^{n}(a_k - b_k)^2} \quad \text{[Equation 3]}$$

$w_k = 1$
$q = 2$

The Chebyshev distance d(c)(a, b) is calculated using the formula shown in Equation 4. That is, it is calculated by setting the weight as $W_k=1$ and the parameter as $q=\infty$ in Equation 2.

$$d_{(\infty)}(a, b) = \max_{k=1,2,\ldots,n} |a_k - b_k| \quad \text{[Equation 4]}$$

$w_k = 1$
$q = \infty$ (2) A Case where the Inter-Vector Similarity is Used as the Index Will be Described.

The index calculation unit 4 calculates the inter-vector similarity between the spectral shape information and the reference spectral shape information and sets it as the index. A method using the inter-vector similarity is shown in Equations 5 and 6.

In Equation 5, a value obtained by subtracting the similarity (cosine similarity or the like) between general vectors from a constant is used as dissimilarity d(a, b).

$$d(a, b) = 1 - (s_{a,b}) \quad \text{[Equation 5]}$$

$$s_{a,b} = \frac{\sum_{k=1}^{n} a_k b_k}{\sqrt{(\sum_{k=1}^{n} a_k^2)(\sum_{l=1}^{n} b_l^2)}}$$

$s_{a,b}$: Similarity Angle separation (Cosine similarity)

In Equation 6, an exponential function with an exponent of a value obtained by multiplying the similarity between general vectors by −1 is used as the dissimilarity d(a, b).

$$d(a,b) = \exp(-(s_{a,b})) \quad \text{[Equation 6]}$$

(3) A Case where the Index Based on the Fitness Function is Used Will be Described.

The index calculation unit 4 calculates the index based on information regarding the fitness function fitted using the spectral shape information and information regarding the reference fitness function fitted using the reference spectral shape information.

Specifically, the index calculation unit 4 first calculates the fitness function fitted to the spectral shape. As the fitness function, for example, (A) a frequency response function of a single-degree-of-freedom damping system, (B) a polynomial function, or the like is used. As a method for generating the above-mentioned fitness function, it is conceivable to use a least-squares method, a maximum likelihood estimation method, or the like. Subsequently, the index calculation unit 4 calculates a coefficient of the fitness function.

(A) When Calculating the Coefficient Using an Amplitude of the Frequency Response Function of the Single-Degree-of-Freedom Damping System The coefficient co of the fitness function is co={m, k, c}. The coefficient co of the fitting function is calculated using Equations 7, 8, and 9. Further, the coefficient co' of the reference fitness function is co'={m', k', c'}.

When the vibration information to be acquired is displacement, for example, the coefficient co of the fitness function may be calculated using Equation 7.

$$G(f) = \frac{1}{\sqrt{(k - 4\pi^2 m f^2)^2 + 4\pi^2 c^2 f^2}} \quad \text{[Equation 7]}$$

G(f): Displacement
m, k, c: Coefficient of s function
f: Frequency

When the vibration information to be acquired is velocity, for example, the coefficient co of the fitness function may be calculated using Equation 8.

$$H(f) = \frac{2\pi f}{\sqrt{(k - 4\pi^2 m f^2)^2 + 4\pi^2 c^2 f^2}} \quad \text{[Equation 8]}$$

H(f): Velocity
m, k, c: Coefficient of fitness function
f: Frequency

When the vibration information to be acquired is acceleration, for example, the coefficient co of the fitness function may be calculated using Equation 9.

$$L(f) = \frac{4\pi^2 f^2}{\sqrt{(k-4\pi^2 mf^2)^2 + 4\pi^2 c^2 f^2}}.$$ [Equation 9]

L(f): Acceleration
m, k, c: Coefficient of fitness function
f: Frequency (B) When Calculating the Coefficient Using a Polynomial Function The coefficient co of the fitness function is co={c0, c1, cn}. The coefficient co of the fitting function is calculated using Equation 10. Further, the coefficient co' of the reference fitness function is co'={c0', c1', . . . , cn'}.

$$g(f) = \Sigma_{k=1}^{n} c_k f^k$$ [Equation 10]

g(f): nth degree polynomial
$c_0, c_1, \ldots, c_n$: Coefficient of fitness function
f: Frequency Subsequently, the index calculation unit 4 calculates the inter-vector distance or the inter-vector similarity using a coefficient vector of the fitness function and a reference coefficient vector of the reference fitness function. The coefficient vector is generated using the coefficient co described above. The reference coefficient vector is generated using the coefficient co' described above.

The inter-vector distance may be, for example, the weighted Minkowski distance, the Euclidean distance, the Chebyshev distance, or the like. Further, the inter-vector similarity may be, for example, the value obtained by subtracting the similarity (cosine similarity or the like) between general vectors from the constant, and the exponential function with an exponent of the value obtained by multiplying the similarity between general vectors by −1, or the like.

However, the fitness function is not limited to the above-mentioned function. Further, the method for calculating the index is not limited to the above-mentioned method.

The state estimation unit 5 estimates the state of the structure 20 based on the index calculated by the index calculation unit 4. Specifically, the state estimation unit 5 first obtains the index calculated using (1) inter-vector distance, (2) inter-vector similarity, (3) fitness function, or the like from the index calculation unit 4. Subsequently, the state estimation unit 5 estimates whether the structure 20 is damaged by using the obtained index and a preset threshold Th2.

As illustrated in FIGS. 5 and 6, when there is damage, the spectral shape is different from the spectral shape (reference spectral shape) before the damage. That is, the index corresponding to the spectral shape after damage and the index corresponding to the reference spectral shape have different values.

Therefore, (1) when the inter-vector distance is used as the index, the greater the difference between the spectral shape after damage and the reference spectral shape, the greater the inter-vector distance, and thus when the index is a threshold Th21 or more, it is determined that the structure 20 is damaged.

Further, (2) when the inter-vector similarity is used as the index, the greater the difference between the spectral shape after damage and the reference spectral shape, the smaller the similarity, that is, the greater the dissimilarity, and thus when the index corresponding to the dissimilarity is a threshold Th22 or more, it is determined that the structure 20 is damaged.

Furthermore, (3) when an inter-coefficient-vector distance or the dissimilarity of the fitness function is used as the index, the greater the difference between the spectral shape after damage and the reference spectral shape, the greater the inter-coefficient-vector distance or the dissimilarity, and thus when the index corresponding to the dissimilarity is a threshold Th23 or more, it is determined that the structure 20 is damaged.

As the threshold Th2 (Th21, Th22, Th3), for example, the threshold corresponding to the index is determined through experimentation or simulation and stored in a storage unit in advance.

The state estimation unit 5 may estimate the state (type of damage) of the structure 20 by using a learning model generated through machine learning or the like. The learning model is generated through supervised learning by inputting distances, similarities or the like, and the types of damage associated with them in a learning phase.

The output information generation unit 26 generates the output information used to output a diagnosis result of the structure 20, the index, the spectral shape, a natural vibration shape, or information regarding two or more of these to the output device 22. Then, the output information generation unit 26 outputs the generated output information to the output device 22.

[Operation of Apparatus]

Figure 7:
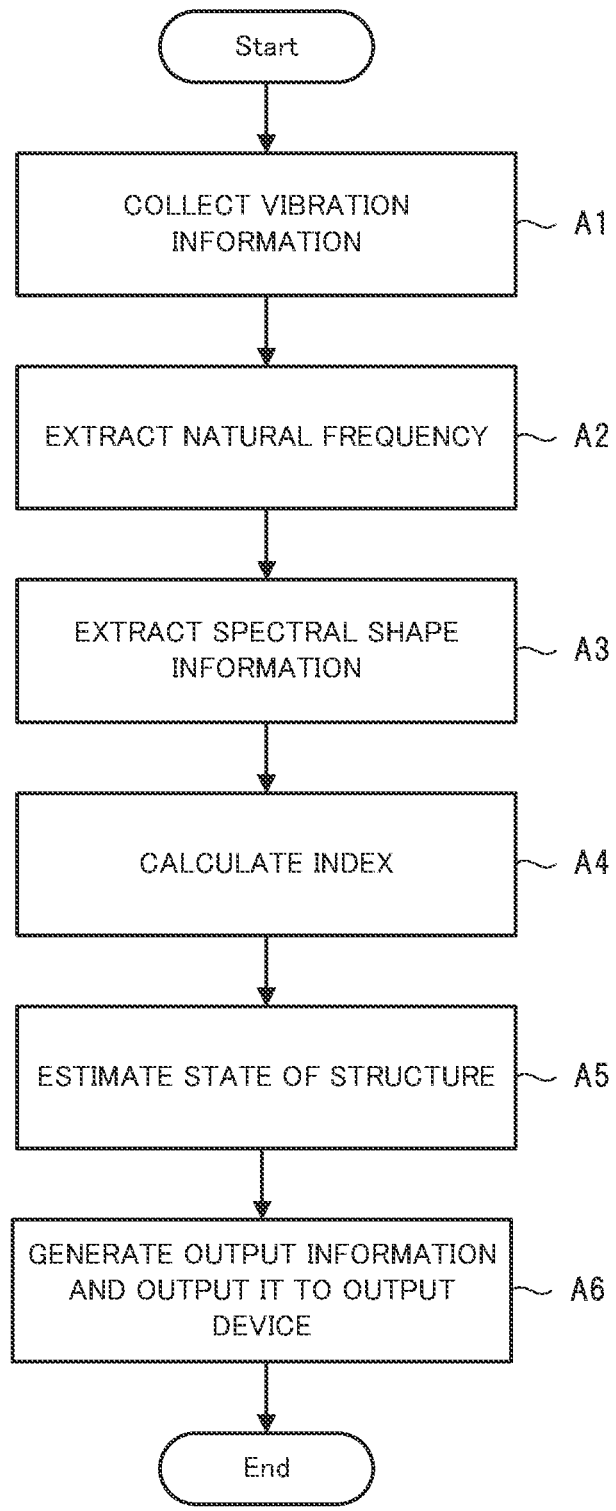
FIG. 7 is a diagram illustrating an example of an operation of the structure diagnosis apparatus.

Next, an operation of the structure diagnosis apparatus in the example embodiment of the present invention will be described with reference to FIG. 7. FIG. 7 is a diagram illustrating an example of the operation of the structure diagnosis apparatus. In the following description, FIGS. 2 to 6 will be appropriately referred to. Further, in the example embodiment, a structure diagnosis method is carried out by operating the structure diagnosis apparatus. Therefore, the description of the structure diagnosis method in the example embodiment will be replaced with the following description of the operation of the structure diagnosis apparatus.

As illustrated in FIG. 7, first, the natural vibration extraction unit 2 acquires the vibration information indicating the vibration generated in the structure 20 from the sensors 21 that the structure 20 is provided with (Step A1). The natural frequency is extracted using the vibration information (Step A2). Subsequently, the spectral shape extraction unit 3 extracts the spectral shape information indicating the shape of the spectrum using the natural frequency (Step A3).

Subsequently, the index calculation unit 4 calculates the index indicating the relationship between the spectral shape information and the reference spectral shape information that is the preset reference (Step A4). Subsequently, the state estimation unit 5 estimates the state of the structure 20 based on the index (Step A5). The output information generation unit 26 generates the output information and outputs it to the output device 22 (Step A6).

Step A1 will be described.

In Step A1, first, the collection unit 23 acquires the acceleration information measured by each of the sensors 21. Specifically, in Step A1, the collection unit 23 receives a signal including the acceleration information measured by each of the sensors 21a to 21n attached to the structure 20.

Step A2 will be described.

In Step A2, the natural vibration extraction unit 2 acquires the vibration information indicating the vibration generated in the structure 20 from the sensors 21 that the structure 20 is provided with, and calculates the natural vibration using the acquired vibration information. The natural vibration is, for example, the primary natural vibration. Further, the natural vibration extraction unit 2 extracts the natural vibration corresponding to the longitudinal vibration as the natural vibration.

Specifically, in Step A2, the natural vibration extraction unit 2 calculates the natural frequency of the natural vibration by using the damping free vibration setting unit 24 and the natural frequency extraction unit 25.

In Step A2, the damping free vibration setting unit 24 first sets the damping free vibration section for each piece of vibration information collected from the sensors 21. Specifically, the damping free vibration setting unit 24 acquires the vibration information indicating the acceleration measured by each of the sensors 21a to 21n, from the collection unit 23.

Subsequently, in Step A2, the damping free vibration setting unit 24 determines whether the acceleration measured by the sensor 21n exceeds the threshold Th1. When the acceleration exceeds the threshold Th1, the damping free vibration setting unit 24 sets the section included in the period of time from the time (the start date and time ts) when the acceleration exceeds the threshold Th1 to the time (the end date and time te) when the predetermined time elapses as the damping free vibration section. Further, the damping free vibration setting unit 24 also sets the damping free vibration section for the vibration information measured by each of the sensors 21a to 21n.

Subsequently, in Step A2, the natural frequency extraction unit 25 extracts the natural frequency based on the selected damping free vibration. Specifically, the natural frequency extraction unit 25 converts the amplitude information (acceleration) from the time domain to the frequency domain (for example, Fourier transform) in the damping free vibration section set for each of the sensors 21a to 21n.

Subsequently, in Step A2, the natural frequency extraction unit 25 extracts the natural frequency fc by using the extraction method 1 or the extraction method 2 described below.

In the extraction method 1, the natural frequency extraction unit 25 extracts the frequency (natural frequency) at which the amplitude is greater than or equal to the predetermined value for each of the sensors 21a to 21n. The frequency at which the amplitude is greater than or equal to the predetermined value is, for example, the frequency at which the amplitude has the maximum value, the local maximum value, or the peak value.

Subsequently, the natural frequency extraction unit 25 sets as the natural frequency fc, for example, the average frequency of the natural frequencies of all the sensors 21, the average frequency of the natural frequencies of two or more preselected sensors 21, or the natural frequency of the preselected sensor 21.

Further, in the extraction method 2, the natural frequency extraction unit 25 calculates the representative spectrum by combining the spectra of all the sensors 21 or the spectra of two or more preselected sensors 21. Combining the spectra means, for example, extracting the maximum value of the amplitude of the spectrum of all the sensors 21 or two or more preselected sensors 21, at each frequency.

Subsequently, the natural frequency extraction unit 25 extracts the frequency (natural frequency) at which the amplitude of the representative spectrum is greater than or equal to the predetermined value, and sets it as the natural frequency fc. The frequency at which the amplitude is greater than or equal to the predetermined value is, for example, the frequency at which the amplitude has the maximum value, the local maximum value, or the peak value.

However, the method for determining the natural frequency fc is not limited to the above-mentioned method.

Step A3 will be described.

In Step A3, the spectral shape extraction unit 3 extracts the spectral shape information indicating the shape of the spectrum using the natural vibration. Specifically, in Step A3, the spectral shape extraction unit 3 first acquires the natural frequency generated from the natural frequency extraction unit 25.

Subsequently, the spectrum shape extractor 3 sets the frequency band including the natural frequency fc. Subsequently, the spectrum shape extractor 3 calculates the measurement spectrum by using the calculation method 1 or the calculation method 2 described below.

In the calculation method 1, the spectral shape extraction unit 3 calculates the measurement spectrum by combining the spectra of all the sensors 21 or the spectra of two or more preselected sensors 21. Combining the spectra means, for example, extracting the maximum value of the amplitude of the spectrum of all the sensors 21 or two or more preselected sensors 21, at each frequency.

Further, in the calculation method 2, the spectral shape extraction unit 3 sets the spectrum of the preselected sensor 21 as the measurement spectrum.

Subsequently, the spectral shape extraction unit 3 generates the spectral shape information used to indicate the spectral shape from the measurement spectrum by using the amplitude and the phase of each frequency within the set frequency band. The spectral shape information can be indicated by, for example, the vector shown in Equation 1.

Step A4 will be described.

In Step A4, the index calculation unit 4 calculates the index indicating the relationship between the spectral shape information and the reference spectral shape information.

Specifically, in Step A4, the index calculation unit 4 calculates the index using (1) inter-vector distance, (2) inter-vector similarity, (3) fitness function, or the like.

(1) The Case where the Inter-Vector Distance is Used as the Index Will be Described.

In Step A4, the index calculation unit 4 calculates the inter-vector distance between the spectral shape information and the reference spectral shape information and sets it as the index. The inter-vector distance is, for example, the weighted Minkowski distance, the Euclidean distance, the Chebyshev distance, or the like. The weighted Minkowski distance $d_{(q)}(a, b)$ is calculated using the formula shown in Equation 2.

The Euclidean distance $d_{(2)}(a, b)$ is calculated using the formula shown in Equation 3. That is, it is calculated by setting the weight as $W_k=1$ and the parameter as $q=2$ in Equation 1.

The Chebyshev distance $d_{(\infty)}(a, b)$ is calculated using the formula shown in Equation 4. That is, it is calculated by setting the weight as $W_k=1$ and the parameter as $q=\infty$ in Equation 1.

(2) The Case where the Inter-Vector Similarity is Used as the Index Will be Described.

In Step A4, the index calculation unit 4 calculates the inter-vector similarity between the spectral shape information and the reference spectral shape information and sets it as the index. The method using the inter-vector similarity is shown in Equations 5 and 6.

In Equation 5, the value obtained by subtracting the similarity (cosine similarity or the like) between general vectors from the constant is used as the dissimilarity d(a, b). In Equation 6, the exponential function with an exponent of the value obtained by multiplying the similarity between general vectors by −1 is used as the dissimilarity d(a, b).

(3) The Case where the Index Based on the Fitness Function is Used Will be Described.

In Step A4, the index calculation unit 4 calculates the index based on the information regarding the fitness function fitted using the spectral shape information and the information regarding reference fitness function fitted using the reference spectral shape information.

Specifically, in Step A4, the index calculation unit 4 first calculates the fitness function fitted to the spectral shape. As the fitness function, for example, (A) the frequency response function of the single-degree-of-freedom damping system, (B) the polynomial function, or the like is used. As the method for generating the above-mentioned fitness function, it is conceivable to use the least-squares method, the maximum likelihood estimation method, or the like. Subsequently, in Step A4, the index calculation unit 4 calculates the coefficient of the fitness function.

(A) When calculating the coefficient using the amplitude of the frequency response function of the single-degree-of-freedom damping system, the coefficient co of the fitness function is co={m, k, c}. The coefficient co of the fitting function is calculated using Equations 7, 8, and 9. Further, the coefficient co' of the reference fitness function is co'={m', k', c'}.

(B) When calculating the coefficient using the polynomial function, the coefficient co of the fitness function is co={c0, c1, . . . , cn}. The coefficient co of the fitting function is calculated using Equation 10. Further, the coefficient co' of the reference fitness function is co'={c0', c1', . . . , cn'}.

Subsequently, in Step A4, the index calculation unit 4 calculates the inter-vector distance or the inter-vector similarity using the coefficient vector of the fitness function and the reference coefficient vector of the reference fitness function. The coefficient vector is generated using the coefficient co described above. The reference coefficient vector is generated using the coefficient co' described above.

The inter-vector distance may be, for example, the weighted Minkowski distance, the Euclidean distance, the Chebyshev distance, or the like. Further, the inter-vector similarity may be, for example, the value obtained by subtracting the similarity (cosine similarity or the like) between general vectors from the constant, and the exponential function with an exponent of the value obtained by multiplying the similarity between general vectors by −1, or the like.

Step A5 will be described.

In Step A5, the state estimation unit 5 estimates the state of the structure 20 based on the index calculated by the index calculation unit 4.

Specifically, in Step A5, the state estimation unit 5 first obtains the index calculated using (1) inter-vector distance, (2) inter-vector similarity, (3) fitness function, or the like from the index calculation unit 4.

Subsequently, in Step A5, the state estimation unit 5 estimates whether the structure 20 is damaged by using the obtained index and the preset threshold Th2.

As illustrated in FIGS. 5 and 6, when there is damage, the spectral shape is different from the spectral shape (reference spectral shape) before the damage. That is, the index corresponding to the spectral shape after damage and the index corresponding to the reference spectral shape have different values.

Therefore, (1) when the inter-vector distance is used as the index, the greater the difference between the spectral shape after damage and the reference spectral shape, the greater the inter-vector distance, and thus when the index is the threshold Th21 or more, it is determined that the structure 20 is damaged.

Further, (2) when the inter-vector similarity is used as the index, the greater the difference between the spectral shape after damage and the reference spectral shape, the smaller the similarity, that is, the greater the dissimilarity, and thus when the index corresponding to the dissimilarity is the threshold Th22 or more, it is determined that the structure 20 is damaged.

Furthermore, (3) when the inter-coefficient-vector distance or the dissimilarity of the fitness function is used as the index, the greater the difference between the spectral shape after damage and the reference spectral shape, the greater the inter-coefficient-vector distance or the dissimilarity, and thus when the index corresponding to the dissimilarity is the threshold Th23 or more, it is determined that the structure 20 is damaged.

Step A6 will be described.

In Step A6, the output information generation unit 26 first generates the output information used to output a diagnosis result of the structure 20, the index, the spectral shape, the natural vibration shape, or the information regarding two or more of these to the output device 22. Subsequently, in Step A6, the output information generation unit 26 outputs the generated output information to the output device 22.

Effects of the Example Embodiment

As described above, according to the example embodiment, it is possible to diagnose the state of the structure in which there is a small change in natural frequency.

For example, the structure 20 such as a concrete girder bridge has high rigidity and is unlikely to shake, so that natural vibration other than the primary natural vibration is unlikely to occur. Further, in such a bridge, even if local damage occurs, occurrence of the local damage cannot be detected because the change in the natural frequency of the primary natural vibration with respect to the local change in rigidity is small.

However, according to the example embodiment, since the state of the structure can be estimated based on the index indicating the relationship between the spectral shape information indicating the shape of the spectrum using the natural vibration and the reference spectral shape information that is the preset reference, it is possible to diagnose the state of a structure even for a structure in which there is a small change in natural frequency.

That is, by comparing the spectral shape including the influence of a newly generated vibration component due to the occurrence of local damage with the reference spectral shape and making a diagnosis based on the comparison result, it is possible to diagnose the state of the structure even for the structure in which there is a small change in natural frequency of the primary natural vibration.

[Program]

A program according to the example embodiment of the present invention may be any program that causes a computer to execute Steps A1 to A6 illustrated in FIG. 7. By installing the program in the computer and executing it, the structure diagnosis apparatus and the structure diagnosis method according to the example embodiment can be realized. In this case, a processor of the computer functions as the collection unit 23, the natural vibration extraction unit 2

(the damping free vibration setting unit 24, the natural frequency extraction unit 25), the spectral shape extraction unit 3, the index calculation unit 4, the state estimation unit 5, and the output information generation unit 26 and executes processing.

Further, the program in the example embodiment may be executed by a computer system constructed by a plurality of computers. In this case, for example, each computer may function as any of the collection unit 23, the natural vibration extraction unit 2 (the damping free vibration setting unit 24, the natural frequency extraction unit 25), the spectral shape extraction unit 3, the index calculation unit 4, the state estimation unit 5, and the output information generation unit 26.

[Physical Configuration]

Figure 8:
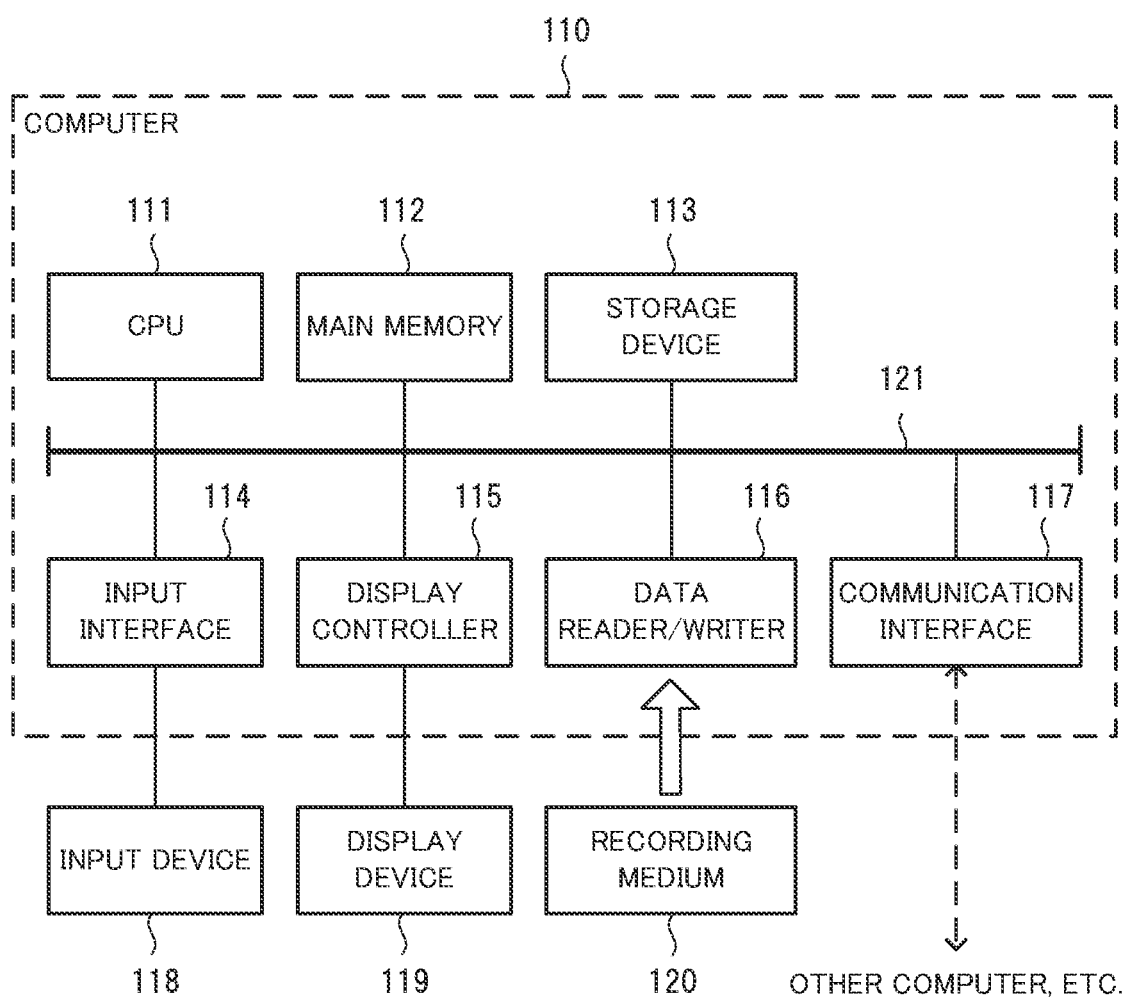
FIG. 8 is a diagram illustrating an example of a computer that realizes the structure diagnosis apparatus.

Here, the computer that realizes the structure diagnosis apparatus by executing the program in the example embodiment will be described with reference to FIG. 8. FIG. 8 is a block diagram illustrating an example of the computer that realizes the structure diagnosis apparatus in the example embodiment of the present invention.

As illustrated in FIG. 8, a computer 110 includes a CPU 111, a main memory 112, a storage device 113, an input interface 114, a display controller 115, a data reader/writer 116, and a communication interface 117. These parts are connected to each other via a bus 121 so as to be capable of data communication. Note that the computer 110 may include a graphics processing unit (GPU) or a field-programmable gate array (an FPGA) in addition to the CPU 111 or in place of the CPU 111.

The CPU 111 expands the program (code) in the example embodiment stored in the storage device 113 into the main memory 112 and executes the program in a predetermined order to perform various operations. The main memory 112 is typically a volatile storage device such as a dynamic random access memory (DRAM). Further, the program in the example embodiment is provided in a state of being stored in a computer-readable recording medium 120. The program in the example embodiment may be distributed on the Internet connected via the communication interface 117.

Further, specific examples of the storage device 113 include a semiconductor storage device such as a flash memory in addition to a hard disk drive. The input interface 114 mediates data transmission between the CPU 111 and an input device 118 such as a keyboard and a mouse. The display controller 115 is connected to a display device 119 and controls display on the display device 119.

The data reader/writer 116 mediates the data transmission between the CPU 111 and the recording medium 120, reads the program from the recording medium 120, and writes a processing result in the computer 110 to the recording medium 120. The communication interface 117 mediates the data transmission between the CPU 111 and another computer.

Further, specific examples of the recording medium 120 include a general-purpose semiconductor storage device such as a compact flash (CF) (registered trademark) and a secure digital (SD), a magnetic recording medium such as a flexible disk, or an optical recording medium such as a compact disk read only memory (CD-ROM).

[Supplementary Note]

The following supplementary notes will be further disclosed with respect to the above example embodiment. A part or all of the above-described example embodiment can be described by (Supplementary note 1) to (Supplementary note 18) described below, but it is not limited to the following descriptions.

(Supplementary Note 1)

A structure diagnosis apparatus including:

a natural vibration extraction unit configured to acquire, from a plurality of sensors that a structure is provided with, vibration information indicating vibration generated in the structure, and to extract natural vibration using the vibration information;

a spectral shape extraction unit configured to extract spectral shape information indicating a shape of a spectrum using the natural vibration;

an index calculation unit configured to calculate an index indicating a relationship between the spectral shape information and reference spectral shape information that is a preset reference; and a state estimation unit configured to estimate a state of the structure based on the index.

(Supplementary Note 2)

The structure diagnosis apparatus according to Supplementary note 1, in which the index calculation unit calculates an inter-vector distance between the spectral shape information and the reference spectral shape information as the index.

(Supplementary Note 3)

The structure diagnosis apparatus according to Supplementary note 1, in which the index calculation unit calculates an inter-vector similarity between the spectral shape information and the reference spectral shape information as the index.

(Supplementary Note 4)

The structure diagnosis apparatus according to Supplementary note 1, in which the index calculation unit calculates the index based on information regarding a fitness function fitted to a function using the spectral shape information and information regarding a reference fitness function fitted to a function using the reference spectral shape information.

(Supplementary Note 5)

The structure diagnosis apparatus according to any one of Supplementary notes 1 to 4, in which the natural vibration is a primary natural vibration.

(Supplementary Note 6)

The structure diagnosis apparatus according to any one of Supplementary notes 1 to 5, in which the natural vibration is a longitudinal vibration.

(Supplementary Note 7)

A structure diagnosis method including:

a natural vibration extraction step of acquiring, from a plurality of sensors that a structure is provided with, vibration information indicating vibration generated in the structure, and extracting natural vibration using the vibration information;

a spectral shape information extraction step of extracting spectral shape information indicating a shape of a spectrum using the natural vibration;

a calculation step of calculating an index indicating a relationship between the spectral shape information and reference spectral shape information that is a preset reference; and an estimating step of estimating a state of the structure based on the index.

(Supplementary Note 8)

The structure diagnosis method according to Supplementary note 7, in which in the calculation step, an inter-vector distance between the spectral shape information and the reference spectral shape information is calculated as the index.

(Supplementary Note 9)

The structure diagnosis method according to Supplementary note 7, in which in the calculation step, an inter-vector similarity between the spectral shape information and the reference spectral shape information is calculated as the index.

(Supplementary Note 10)

The structure diagnosis method according to Supplementary note 7, in which in the calculation step, the index is calculated based on information regarding a fitness function fitted to a function using the spectral shape information and information regarding a reference fitness function fitted to a function using the reference spectral shape information.

(Supplementary Note 11)

The structure diagnosis method according to any one of Supplementary notes 7 to 10, in which the natural vibration is a primary natural vibration.

(Supplementary Note 12)

The structure diagnosis method according to any one of Supplementary notes 7 to 11, in which the natural vibration is a longitudinal vibration.

(Supplementary Note 13)

A computer-readable recording medium for recording a program including instructions that cause a computer to perform the following steps:

- a natural vibration extraction step of acquiring, from a plurality of sensors that a structure is provided with, vibration information indicating vibration generated in the structure, and extracting natural vibration using the vibration information;
- a spectral shape information extraction step of extracting spectral shape information indicating a shape of a spectrum using the natural vibration;
- a calculation step of calculating an index indicating a relationship between the spectral shape information and reference spectral shape information that is a preset reference; and
- an estimating step of estimating a state of the structure based on the index.

(Supplementary Note 14)

The computer-readable recording medium according to Supplementary note 13, in which in the calculation step, an inter-vector distance between the spectral shape information and the reference spectral shape information is calculated as the index.

(Supplementary Note 15)

The computer-readable recording medium according to Supplementary note 13, in which in the calculation step, an inter-vector similarity between the spectral shape information and the reference spectral shape information is calculated as the index.

(Supplementary Note 16)

The computer-readable recording medium according to Supplementary note 13, in which in the calculation step, the index is calculated based on information regarding a fitness function fitted to a function using the spectral shape information and information regarding a reference fitness function fitted to a function using the reference spectral shape information.

(Supplementary Note 17)

The computer-readable recording medium according to any one of Supplementary notes 13 to 16, in which the natural vibration is a primary natural vibration.

(Supplementary Note 18)

The computer-readable recording medium according to any one of Supplementary notes 13 to 17, in which the natural vibration is a longitudinal vibration.

Although the present invention has been described above with reference to the example embodiment, the present invention is not limited to the above example embodiment. Various changes that can be understood by those skilled in the art can be made within the scope of the present invention in terms of the structure and details of the present invention.

This application claims priority on the basis of Japanese Patent Application No. 2019-040049 filed on Mar. 5, 2019, the entire disclosure of which is incorporated herein by reference.

INDUSTRIAL APPLICABILITY

As described above, according to the present invention, it is possible to diagnose the state of the structure in which there is a small change in natural frequency. The present invention is useful in fields in which the diagnosis of structures is required.

REFERENCE SIGNS LIST

1 Structure diagnosis apparatus
2 Natural vibration extraction unit
3 Spectral shape extraction unit
4 Index calculation unit
5 State estimation unit
20 Structure
21 Sensor
22 Output device
23 Collection unit
24 Damping free vibration setting unit
25 Natural frequency extraction unit
26 Output information generation unit
110 Computer
111 CPU
112 Main memory
113 Storage device
114 Input interface
115 Display controller
116 Data reader/writer
117 Communication interface
118 Input device
119 Display device
120 Recording medium
121 Bus

What is claimed is:

1. A structure diagnosis apparatus comprising:

a processor; and a memory storing program code executable by the processor to:

acquire vibration information indicating an acceleration measured by each of a plurality of sensors provided in a structure;

set a damping free vibration section for the acquired vibration information;

convert the acceleration from a time domain to a frequency domain in the damping free vibration section set for each of the sensors;

calculate a representative spectrum by combining spectra of all of the sensors or the spectra of two or more preselected of the sensors;

extract a frequency at which an amplitude of the representative spectrum is greater than or equal to a predetermined value;

set the extracted frequency as a natural frequency;

set a frequency band including the natural frequency;

extract spectral shape information used to indicate a spectral shape from a measurement spectrum by using an amplitude and phase of each of a plurality of frequencies within the set frequency band;

calculate an index based on information regarding a fitness function fitted to a function using the spectral shape information and information regarding a reference fitness function fitted to a function using reference spectral shape information; and estimate a state of the structure based on the index.

2. The structure diagnosis apparatus according to claim 1, wherein the natural frequency corresponds to a natural vibration that is a primary natural vibration.

3. The structure diagnosis apparatus according to claim 1, wherein the natural frequency corresponds to a natural vibration that is a longitudinal vibration.

4. A structure diagnosis method performed by a computer and comprising:

acquiring vibration information indicating an acceleration measured by each of a plurality of sensors provided in a structure;

setting a damping free vibration section for the acquired vibration information;

converting the acceleration from a time domain to a frequency domain in the damping free vibration section set for each of the sensors;

calculating a representative spectrum by combining spectra of all of the sensors or the spectra of two or more preselected of the sensors;

extracting a frequency at which an amplitude of the representative spectrum is greater than or equal to a predetermined value;

setting the extracted frequency as a natural frequency;

setting a frequency band including the natural frequency;

extracting spectral shape information used to indicate a spectral shape from a measurement spectrum by using an amplitude and phase of each of a plurality of frequencies within the set frequency band;

calculating an index based on information regarding a fitness function fitted to a function using the spectral shape information and information regarding a reference fitness function fitted to a function using reference spectral shape information; and estimating a state of the structure based on the index.

5. The structure diagnosis method according to claim 4, wherein the natural frequency corresponds to a natural vibration that is a primary natural vibration.

6. The structure diagnosis method according to claim 4, wherein the natural frequency corresponds to a natural vibration that is a longitudinal vibration.

7. A non-transitory computer-readable recording medium storing a program executable by a computer to perform processing comprising:

acquiring vibration information indicating an acceleration measured by each of a plurality of sensors provided in a structure;

setting a damping free vibration section for the acquired vibration information;

converting the acceleration from a time domain to a frequency domain in the damping free vibration section set for each of the sensors;

calculating a representative spectrum by combining spectra of all of the sensors or the spectra of two or more preselected of the sensors;

extracting a frequency at which an amplitude of the representative spectrum is greater than or equal to a predetermined value;

setting the extracted frequency as a natural frequency;

setting a frequency band including the natural frequency;

extracting spectral shape information used to indicate a spectral shape from a measurement spectrum by using an amplitude and phase of each of a plurality of frequencies within the set frequency band;

calculating an index based on information regarding a fitness function fitted to a function using the spectral shape information and information regarding a reference fitness function fitted to a function using reference spectral shape information; and estimating a state of the structure based on the index.

8. The non-transitory computer-readable recording medium according to claim 7, wherein the natural frequency corresponds to a natural vibration that is a primary natural vibration.

9. The non-transitory computer-readable recording medium according to claim 7, wherein the natural frequency corresponds to a natural vibration that is a longitudinal vibration.

* * * * *